(12) United States Patent
Desai

(10) Patent No.: US 6,282,328 B1
(45) Date of Patent: *Aug. 28, 2001

(54) MACHINE VISION SYSTEMS AND METHODS FOR MORPHOLOGICAL TRANSFORMATION OF AN IMAGE WITH NON-UNIFORM OFFSETS

(75) Inventor: Ranjit P. Desai, Framingham, MA (US)

(73) Assignee: Cognex Corporation, Natick, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/014,670

(22) Filed: Jan. 28, 1998

(51) Int. Cl.$^7$ .......................................... G06K 9/56
(52) U.S. Cl. .............................. 382/308; 382/205
(58) Field of Search ........................... 382/308, 307, 382/205, 218, 219, 257, 141, 145, 149

(56) References Cited

U.S. PATENT DOCUMENTS

| 3,816,722 | 6/1974 | Sakoe et al. . |
| 3,936,800 | 2/1976 | Ejiri et al. . |
| 3,967,100 | 6/1976 | Shimomura . |

(List continued on next page.)

FOREIGN PATENT DOCUMENTS

| 0 527 632 A2 | 2/1993 | (EP) . |
| WO 95/122137 | 8/1995 | (WO) . |
| WO 95/21376 | 8/1995 | (WO) . |
| WO 97/21189 | 6/1997 | (WO) . |
| WO 97/22858 | 6/1997 | (WO) . |
| WO 97/24692 | 7/1997 | (WO) . |
| WO 97/24693 | 7/1997 | (WO) . |

OTHER PUBLICATIONS

D. Gevorkian, J. Astola and S. Atourian, "Improving Gil–Werman Algorithm for Running Min and Max Filters", IEEE PAMI vol. 19, No. 5, May 1997, pp. 526–529.

Intel Corp, Architecture Manuals, Guidelines for Developing MMX Code, Chapter 3; pp. 3–1–3–26, http://developer.intel.com/mmx/manuals/dg/filename.htm.

(List continued on next page.)

*Primary Examiner*—Yon J. Couso
(74) *Attorney, Agent, or Firm*—David J. Powsner (57) ABSTRACT

The invention provides machine vision systems and methods for morphological transformation of a source image, e.g., with non-uniform offsets. According to these, pixels from selected "neighborhoods," or regions, of the source image are rearranged, or unfolded, into respective columns of an intermediate image. For each column in the intermediate image, the method identifies a pixel intensity value of selected rank. Once the pixel intensity value of selected rank is identified for each column, it is retained in a transformation image, e.g., at a location corresponding to center of the respective neighborhood. The foregoing steps are repeated, e.g., along strips or bands, for each neighborhood in the source image.

24 Claims, 4 Drawing Sheets

U.S. PATENT DOCUMENTS

| | | |
|---|---|---|
| 3,968,475 | 7/1976 | McMahon . |
| 3,978,326 | 8/1976 | Shimomura . |
| 4,011,403 | 3/1977 | Epstein et al. . |
| 4,115,702 | 9/1978 | Nopper . |
| 4,115,762 | 9/1978 | Akiyama et al. . |
| 4,183,013 | 1/1980 | Agrawala et al. . |
| 4,200,861 | 4/1980 | Hubach et al. . |
| 4,254,400 | 3/1981 | Yoda et al. . |
| 4,300,164 | 11/1981 | Sacks . |
| 4,385,322 | 5/1983 | Hubach et al. . |
| 4,441,124 | 4/1984 | Heebner et al. . |
| 4,441,206 | 4/1984 | Kuniyoshi et al. . |
| 4,534,813 | 8/1985 | Williamson et al. . |
| 4,541,116 | 9/1985 | Lougheed . |
| 4,570,180 | 2/1986 | Baier et al. . |
| 4,577,344 | 3/1986 | Warren et al. . |
| 4,581,762 | 4/1986 | Lapidus et al. . |
| 4,606,065 | 8/1986 | Beg et al. . |
| 4,617,619 | 10/1986 | Gehly . |
| 4,630,306 | 12/1986 | West et al. . |
| 4,688,088 | 8/1987 | Hamazaki et al. . |
| 4,706,168 | 11/1987 | Weisner . |
| 4,728,195 | 3/1988 | Silver . |
| 4,730,260 | 3/1988 | Mori et al. . |
| 4,731,858 | 3/1988 | Grasmueller et al. . |
| 4,736,437 | 4/1988 | Sacks et al. . |
| 4,742,551 | 5/1988 | Deering . |
| 4,764,870 | 8/1988 | Haskin . |
| 4,771,469 | 9/1988 | Witttenburg . |
| 4,783,826 | 11/1988 | Koso . |
| 4,783,828 | 11/1988 | Sadjadi . |
| 4,783,829 | 11/1988 | Miyakawa et al . . |
| 4,831,580 | 5/1989 | Yamada . |
| 4,860,374 | 8/1989 | Murakami et al. . |
| 4,860,375 | 8/1989 | McCubbrey et al. . |
| 4,876,457 | 10/1989 | Bose . |
| 4,876,728 | 10/1989 | Roth . |
| 4,903,218 | 2/1990 | Longo et al. . |
| 4,907,169 | 3/1990 | Lovoi . |
| 4,914,553 | 4/1990 | Hamada et al. . |
| 4,922,543 | 5/1990 | Ahlbom et al. . |
| 4,926,492 | 5/1990 | Tanaka et al. . |
| 4,932,065 | 6/1990 | Feldgajer . |
| 4,953,224 | 8/1990 | Ichinose et al. . |
| 4,955,062 | 9/1990 | Terui . |
| 4,959,898 | 10/1990 | Landman et al. . |
| 4,962,423 | 10/1990 | Yamada et al. . |
| 4,972,359 | 11/1990 | Silver et al. . |
| 4,982,438 | 1/1991 | Usami et al. . |
| 5,012,402 | 4/1991 | Akiyama . |
| 5,046,190 | 9/1991 | Daniel et al. . |
| 5,054,096 | 10/1991 | Beizer . |
| 5,060,276 | 10/1991 | Morris et al. . |
| 5,063,608 | 11/1991 | Siegel . |
| 5,073,958 | 12/1991 | Imme . |
| 5,081,656 | 1/1992 | Baker et al. . |
| 5,081,689 | 1/1992 | Meyer et al. . |
| 5,086,478 | 2/1992 | Kelly-Mahaffey et al. . |
| 5,090,576 | 2/1992 | Menten . |
| 5,091,861 | 2/1992 | Geller et al. . |
| 5,091,968 | 2/1992 | Higgins et al. . |
| 5,093,867 | 3/1992 | Hori et al. . |
| 5,113,565 | 5/1992 | Cipolla et al. . |
| 5,115,309 | 5/1992 | Hang . |
| 5,119,435 | 6/1992 | Berkin . |
| 5,124,622 | 6/1992 | Kawamura et al. . |
| 5,133,022 | 7/1992 | Weideman . |
| 5,134,575 | 7/1992 | Takagi . |
| 5,143,436 | 9/1992 | Baylor et al. . |
| 5,145,432 | 9/1992 | Midland et al. . |
| 5,151,951 | 9/1992 | Ueda et al. . |
| 5,153,925 | 10/1992 | Tanioka et al. . |
| 5,159,281 | 10/1992 | Hedstrom et al. . |
| 5,159,645 | 10/1992 | Kimagai . |
| 5,164,994 | 11/1992 | Bushroe . |
| 5,168,269 | 12/1992 | Harlan . |
| 5,185,855 | 2/1993 | Kato et al. . |
| 5,189,712 | 2/1993 | Kajiwara et al. . |
| 5,206,820 | 4/1993 | Ammann et al. . |
| 5,216,503 | 6/1993 | Paik . |
| 5,225,940 | 7/1993 | Ishii et al. . |
| 5,230,027 | 7/1993 | Kikuchi . |
| 5,243,607 | 9/1993 | Masson et al. . |
| 5,253,306 | 10/1993 | Nishio . |
| 5,253,308 | 10/1993 | Johnson . |
| 5,265,173 | 11/1993 | Griffin et al. . |
| 5,271,068 | 12/1993 | Ueda et al. . |
| 5,287,449 | 2/1994 | Kojima . |
| 5,297,256 | 3/1994 | Wolstenholme et al. . |
| 5,299,269 | 3/1994 | Gaborski et al. . |
| 5,311,598 | 5/1994 | Bose et al. . |
| 5,315,388 | 5/1994 | Shen et al. . |
| 5,319,457 | 6/1994 | Nakahashi et al. . |
| 5,327,156 | 7/1994 | Masukane et al. . |
| 5,337,267 | 8/1994 | Colavin . |
| 5,363,507 | 11/1994 | Nakayama et al. . |
| 5,367,439 | 11/1994 | Mayer et al. . |
| 5,367,667 | 11/1994 | Wahlquist et al. . |
| 5,371,690 | 12/1994 | Engel et al. . |
| 5,388,197 | 2/1995 | Rayner . |
| 5,388,252 | 2/1995 | Dreste et al. . |
| 5,398,292 | 3/1995 | Aoyama . |
| 5,432,525 | 7/1995 | Maruo et al. . |
| 5,440,699 | 8/1995 | Farrand et al. . |
| 5,455,870 | 10/1995 | Sepai et al. . |
| 5,455,933 | 10/1995 | Schieve et al. . |
| 5,475,766 | 12/1995 | Tsuchiya et al. . |
| 5,477,138 | 12/1995 | Efjavic et al. . |
| 5,481,712 | 1/1996 | Silver et al. . |
| 5,485,570 | 1/1996 | Bushboom et al. . |
| 5,491,780 | 2/1996 | Fyles et al. . |
| 5,495,424 | 2/1996 | Tokura . |
| 5,495,537 | 2/1996 | Bedrosian et al. . |
| 5,519,840 | 5/1996 | Matias et al. . |
| 5,526,050 | 6/1996 | King et al. . |
| 5,532,739 | 7/1996 | Garakani et al. . |
| 5,550,763 | 8/1996 | Michael . |
| 5,566,877 | 10/1996 | McCormack . |
| 5,568,563 | 10/1996 | Tanaka et al. . |
| 5,574,668 | 11/1996 | Beaty . |
| 5,574,801 | 11/1996 | Collet-Beillon . |
| 5,583,949 | 12/1996 | Smith et al. . |
| 5,583,954 | 12/1996 | Garakani . |
| 5,592,562 | 1/1997 | Rooks . |
| 5,594,859 | 1/1997 | Palmer et al. . |
| 5,602,937 | 2/1997 | Bedrosian et al. . |
| 5,608,872 | 3/1997 | Schwartz et al. . |
| 5,640,199 | 6/1997 | Garakani et al. . |
| 5,640,200 | 6/1997 | Michael . |
| 5,848,189 | * 12/1998 | Pearson et al. ................... 382/218 |

OTHER PUBLICATIONS

Intel Corp, Architecture Manuals, MMX Code Development Strategey, Chapter 4; pp. 4–1–4–7; http://developer.intel.com/mmx/manuals/dg/filename.htm.

Intel Corp, Architecture Manuals, MMX Coding Techniques, Chapter 5; pp. 5–1–5–10; http://developer.intel.com/mmx/manuals/dg/filename.htm.

Intel Corp, Processor Optimizations, Optimization Techniques for Integer Blended Code, Chapter 3, pp. 3–1–3–36; http;//developer,intel.com/drg/productname/appnotes/filename.

J. Gil and M. Werman, "Computing 2–D Min, Median and Max Filters", IEEE PAMI, vol. 15, No. 5, pp. 504–507, May 1993.

Grimson, W. Eric L. and Huttenlocher, Daniel P.. "On the Sensitivity of the Hough Transform for Object Recognition", May 1990, IEEE Transactions on Pattern Analysis and Machine Intelligence, vol. 12, No. 3.

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communications of the ACM 24:563–573.

Newsletter from Acquity Imaging, Inc., "Remote Vision Support Package—The Phones Are Ringing!," 1 page.

PictureTel Corporation Product Brochure "Picturetel Live PCS 100(tm) Personal Visual Communications System," 3 pp. (1993).

PictureTel Corporation Product Brochure "Picturetel System 1000: Complete Videoconferencing for Cost Sensitive Applications," 4 pp. (1993).

PictureTel Corporation Product Brochure, "Picturetel System 4000(tm) A Family of Models To Fit Your Application From Offices To Boardrooms, Classrooms, and Auditoriums," 4 pp. (1993).

Horn, Berthold Klaus Paul. "Robot Vision", The Massachusetts Institute for Technology, 1986.

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robot Vision", The Massachusettes Institute for Technology, 1986.

Rosenfeld, Azriel. "Computer Vision: Basic Principles," Proceedings of the IEEE. vol. 76, No. 8, Aug. 1988. pp. 863–868.

* cited by examiner

| | max (a0', a1', a2', a3', a4', a5', a6', a7', a8') | max (a1', a2', b0', b1', a5', b3', a7', a8', b6') | max (a2', b0', b1', a5', b3', b4', a8', b6', b7') | max (b0', b1', b2', b3', b4', b5', b6', b7', b8') | max (b1', b2', c0', b4', b5', c3', b7', b8', c6') | max (b2', c0', c1', b5', c3', c4', b8', c6', c7') | max (c0', c1', c2', c3', c4', c5', c6', c7', c8') | max (c1', c2', d0', c4', c5', d3', c7', c8', d6') | max (c2', d0', d1', c5', d3', d4', c8', d6', d7') | max (d0', d1', d2', d3', d4', d5', d6', d7', d8') | max (d1', d2', e0', d4', d5', e3', d7', d8', e6') | max (d2', e0', e1', d5', e3', e4', d8', e6', e7') | max (e0', e1', e2', e3', e4', e5', e6', e7', e8') | max (e1', e2', f0', e4', e5', f3', e7', e8', f6') | max (e2', f0', f1', e5', f3', f4', e8', f6', f7') | max (f0', f1', f2', f3', f4', f5', f6', f7', f8') | max (f1', f2', g0', f4', f5', g3', f6', f7', g6') | max (f2', g0', g1', f5', g3', g4', f8', g6', g7') | max (g0', g1', g2', g3', g4', g5', g6', g7', g8') | max (g1', g2', h0', g4', g5', h3', g7', g8', h6') | max (g2', h0', h1', g5', h3', h4', g8', h6', h7') | max (h0', h1', h2', h3', h4', h5', h6', h7', h8') | | | |

MACHINE VISION SYSTEMS AND METHODS FOR MORPHOLOGICAL TRANSFORMATION OF AN IMAGE WITH NON-UNIFORM OFFSETS

RESERVATION OF COPYRIGHT

The disclosure of this patent document contains material that is subject to copyright protection. The owner thereof has no objection to facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The invention pertains to machine vision and, more particularly, to the morphological transformation of images, e.g., via dilation and erosion, suitable for use with non-uniform offsets.

Machine vision is the automated analysis of images to determine characteristics of objects shown in them. It is often employed in automated manufacturing lines, where images of components are analyzed to determine placement and alignment during assembly. Machine vision is also used for quality assurance. For example, in the semiconductor device industry, images of chips are analyzed to insure that leads, solder paste and other components do not overrun designated boundaries.

In many machine vision applications, so-called dilation and erosion software "tools" are used to emphasize or de-emphasize patterns in digital images and, thereby, to facilitate the recognition of objects in them. They are generally applied during image preprocessing, that is, prior to pattern recognition. As a result, they are referred to as morphological (or shape-based) transformation tools.

As its name implies, the dilation tool is used to enlarge features in an image. Roughly speaking, it does this by replacing each pixel (or point) in the image with its brightest neighbor. For example, if a given pixel has an intensity of 50 and one of its nearby neighbors has an intensity of 60, the value of the latter is substituted for the former. Application of this tool typically enlarges and emphasizes foreground surfaces, edges and other bright features.

The erosion tool does just the opposite. It de-emphasizes bright features by eroding their borders. Rather than replacing each pixel with its brightest neighbor, this tool replaces each with its dimmest, or least intense, neighbor. This can have the effect of diminishing bright foreground features, though, it is typically used to eliminate small imaging artifacts, such as those resulting from reflections, scratches or dust.

Prior art dilation and erosion tools are legion. A problem with many such tools, however, is that they cannot be readily adapted to compensate for a wide range of image-capture environments. One particular problem in this regard is uneven illumination, which can alter an image so much so as to make pattern recognition difficult.

Although fast, accurate and flexible morphological vision tools are marketed by Cognex Corporation, the assignee hereof, there remains a need for still better such tools. Accordingly, an object of this invention is to provide machine vision systems and methods for morphological transformation of images, e.g., acquired with poor illumination.

A more particular object of the invention is to provide such systems and methods as can be used to generate image dilations and erosions, e.g., with non-uniform offsets.

A further object of the invention is to provide such systems as operate accurately and rapidly, yet, without requiring unduly expensive processing equipment or without undue consumption of resources.

A related object of the invention is to provide such systems as can be implemented on conventional digital data processors or other conventional machine vision analysis equipment, without excessive cost or difficulty.

SUMMARY OF THE INVENTION

The foregoing are among the objects attained by the invention, which provides machine vision systems and methods for morphological transformation of a source image, e.g., with non-uniform offsets. Such methods have application, for example, in inspection applications where illumination is not uniform.

In one aspect, the invention provides a method of morphological transformation of an image in which the pixels from selected "neighborhoods," or regions, of the source image are rearranged, or unfolded, into respective columns of an intermediate image. Thus, for example, the first 3×3 neighborhood in the source image can be unfolded into one column of the intermediate image; the second 3×3 neighborhood into the second column; and so forth. The unfolded neighborhoods can be stored in a data store, such as a cache memory or buffer, of a digital data processing system on which the invention is practiced.

For each column in the intermediate image, the method identifies a pixel intensity value of selected rank. Where the method is employed to effect a dilation transformation, for example, the method identifies the maximum pixel intensity in each column. For an erosion transformation, the method seeks the minimum value in each column. Other transformations may require averages or other functions of the compared pixel intensities. The pixel intensity value of selected rank (e.g., minimum or maximum) can be determined, e.g., by a series of pair-by-pair comparisons among the values in each column, by sorting the column, or by an en masse operation, e.g., using a register-level instruction of a superscalar processor.

Once the pixel intensity value of selected rank is identified for each column, it is retained in a transformation image, e.g., at a location corresponding to center of the respective neighborhood. Thus, for example, in a dilation operation, the maximum pixel intensity value for the first column can be stored in the transformation image at a location corresponding to the center of the first neighborhood; that for the second column, the center of the second neighborhood; and so forth.

Take, for example, a 6×3 region of a source image whose pixel intensities are as follows:

| 11 | 2  | 3  | 4  | 15 | 7  |
|----|----|----|----|----|----|
| 6  | 12 | 8  | 14 | 10 | 16 |
| 1  | 7  | 13 | 9  | 5  | 3  |

The first two non-overlapping neighborhoods in that image can be unfolded as follows:

| | |
|---|---|
| 11 | 4 |
| 2 | 15 |
| 3 | 7 |
| 6 | 14 |
| 12 | 10 |
| 8 | 16 |
| 1 | 9 |
| 7 | 5 |
| 13 | 3 |

The maximum pixel intensisty values, for purposes of a dilation operation, are as follows:

| | |
|---|---|
| 13 | 16 |

These values also constitute the maximum pixel intensity values for the corresponding neighborhoods constituting the pixels 11, 2, 3, 6, 12, 8, 1, 7, 13 and 4, 15, 7, 14, 10, 16, 9, 5, 3, respectively. Accordingly, they can be stored in the transformation image at locations corresponding to the centers of those respective neighborhoods, i.e., at locations corresponding to the original pixels of intensity 12 and 10, respectively.

The foregoing steps are repeated, e.g., along strips or bands, for each neighborhood in the source image.

Further aspects of the invention provide methods as described above in which an offset is added to each pixel intensity value prior to its comparison with other values in the column. According to this aspect of the invention, selected columns or pixels a first row of the intermediate image are loaded into corresponding columns in a first data store, e.g., a processor register. Selected columns of a second row of that image are likewise loaded into a second data store, e.g., another processor register. Offsets are added to the intensity values in each of the first and second stores. For this purpose, an array of offsets—one corresponding to each column in the data stores—can itself be stored in a processor register. As above, respective columns of the offset-adjusted data stores are compared with one another to identify the pixel intensity value of selected rank.

The "winners" of each respective pair-by-pair comparison are stored in the first data store, so that the process can be repeated for the remaining values in the respective neighborhoods. For example, following storage of the winners for the first and second rows, the pixels in a third row of the intermediate image are loaded into corresponding columns in the second data store. An offset is then added to each of those values, prior to their being compared with corresponding values in the first data store. Once again, the winners of each respective pair-by-pair comparison are stored in the first data store. The foregoing process is repeated until the offset-adjusted pixel intensity values in each respective row of the intermediate image have been compared with one another.

Still other aspects of the invention provide digital data processing system operating in accord with methods as described above, while yet still other aspects of the invention provide articles of manufacture including a computer usable medium embodying program code for causing a digital data processor to carry out such methods.

These and other aspects of the invention are evident in the drawings and in the description that follows.

Systems and methods provided by the invention utilize processor resources in such a manner as to take advantage, e,g., of SIMD (Single Instruction Multiple Data) pipelined architecture characteristics. These systems and methods require only a limited number of registersrequire only a limited number of registers in order to generate morphological transformations. As a result, they permit higher pixel throughput and, consequently, speed processing of images. They also allow processing of larger images. Moreover, the systems and methods organize data flow in a manner that minimizes memory access penalties, specifically, through better utilization of data residing in cache. This minimizes memory faults and, therefore, speeds image processing.

The invention has wide application in industry and research applications. The dilation and erosions transformations provided thereby can be cascaded to produce still more complex morphological transformations, such as "opening" (e.g., erosion followed by dilation) and "closing" (e.g., dilation followed by erosion). It facilitates automated analysis of images by providing rapid and low-cost methods and apparatus for image transformation. Thus, for example, a manufacturing line equipped with a machine vision system operating in accord with the invention can readily generate dilated and eroded images to speed analysis of images during assembly and, thereby, more efficiently control component placement.

BRIEF DESCRIPTION OF THE DRAWINGS

A more complete understanding of the invention may be attained by reference to the drawings, in which.

DETAILED DESCRIPTION OF THE
ILLUSTRATED EMBODIMENT

Figure 1:
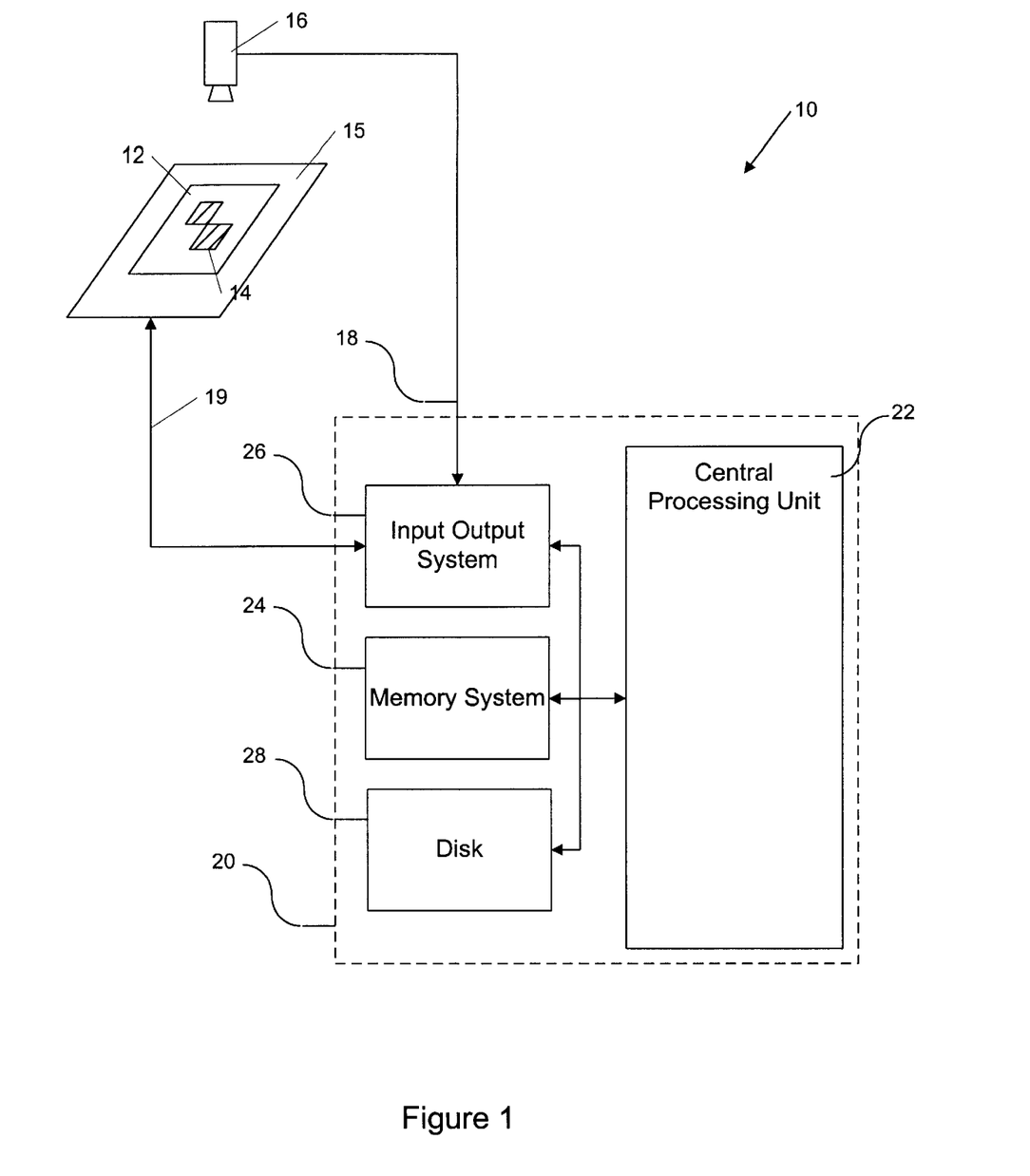
FIG. 1 depicts a digital data processing system according to the invention for generating a morphological transformation of an image.

FIG. 1 depicts a machine vision system 10 according to the invention for morphological transformation of images. The system 10 includes an image capture device, e.g., camera 16, that generates an image of a scene including object 12. Digital image data (or pixels) generated by the capturing device 16 represent, in the conventional manner, the image intensity (e.g., contrast, color, brightness) of each point in the field of view of the capturing device. The image acquisition device may be video camera, charge coupled display (CCD) device, or any other device suitable for imaging device at least a target 14 disposed on object 12. In the illustration, the object 12 is disposed on a platform 15 capable of translating and rotating the object, e.g., based on information determined by image analysis system 20 in connection with the morphological transformations described herein.

Digital image data is transmitted from capturing device 16 via a communications path 18 to the image analysis system 20. This can be a conventional digital data processor, or a vision processing system of the type commercially available from the assignee hereof, Cognex Corporation, as programmed in accord with the teachings hereof to dilate, erode or otherwise morphologically transpose an image acquired by device 16. The image analysis system 20 may have one or more central processing units 22, main memory 24, input-output system 26, and disk drive (or other mass storage device) 28, all of the conventional type. A preferred central processing unit for use in carrying out methods according to the invention has a superscalar instruction set, e.g., the Intel MMX Processors.

The system 20 and, more particularly, central processing unit 22, is configured by programming instructions according to teachings hereof for operation as further described and illustrated herein. Those skilled in the art will appreciate that, in addition to implementation on a programmable digital data processor, the methods taught herein can be implemented in special purpose hardware.

Figure 2:
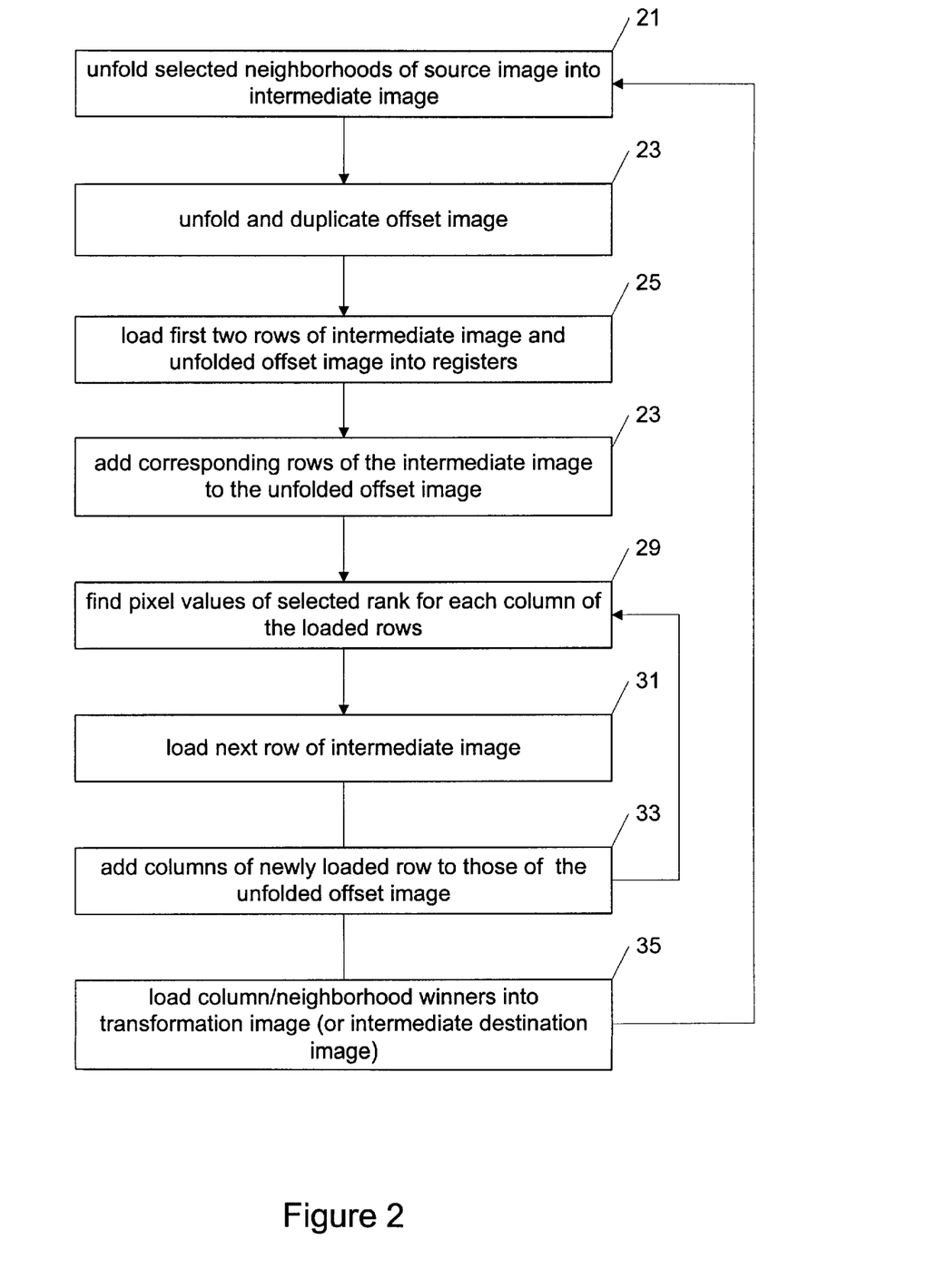
FIG. 2 depicts a method according to the invention for transforming an image, while adding non-uniform offsets to the pixel intensity values thereof.

FIG. 2 illustrates a method according to the invention for generating a morphological transformation, and, particularly, a dilation image, from an image acquired by capturing device 16 or an image otherwise present on image analysis system 20. To illustrate operation of this aspect of the invention, the source image is depicted as a 24×6 array of pixels, with each pixel intensity value (e.g., a contrast, color or brightness) designated by its location in a respective one of the neighborhoods (e.g., "a0" for the first pixel in neighborhood "a", and "p8" for the ninth pixel in neighborhood "p"). In the embodiment described below, morphological transformation is conducted using 3×3 neighborhoods in the image. Those skilled in the art will appreciate that, though typical, such a neighborhood size is not necessitated by the invention, which contemplates the use of rectangular and square neighborhoods of other sizes as well.

| a0 | a1 | a2 | b0 | b1 | b2 | | g0 | g1 | g2 | h0 | h1 | h2 | |
|----|----|----|----|----|----|---|----|----|----|----|----|----|---|
| a3 | a4 | a5 | b3 | b4 | b5 | ⋯ | g3 | g4 | g5 | h3 | h4 | h5 | |
| a6 | a7 | a8 | b6 | b7 | b8 | | g6 | g7 | g8 | h6 | h7 | h8 | |
| i0 | i1 | i2 | j0 | j1 | j2 | ⋯ | o0 | o1 | o2 | p0 | p1 | p2 | Source Image |
| i3 | i4 | i5 | j3 | j4 | j5 | | o3 | o4 | o5 | p3 | p4 | p5 | |
| i6 | i7 | i8 | j6 | j7 | j8 | | o6 | o7 | o8 | p6 | p7 | p8 | |

In the illustrated embodiment, the non-uniform offset array is sized in accord with the neighborhoods of the image, i.e., 3×3 pixels, as shown below. Those skilled in the art will appreciate that offset arrays of other sizes may be used as well. As above, the pixel intensity value of each element of the offset array is designated by its respective position in the array. Although the invention is adapted for use with non-uniform values in that array, it will be appreciated that the invention can be practiced with zero offsets or other uniform offsets.

| s0 | s1 | s2 | |
|----|----|----|---|
| s3 | s4 | s5 | Offset Array |
| s6 | s7 | s8 | |

In step 21, the system "unfolds" each neighborhood so that it occupies a single column of an intermediate image. Not all of the neighborhoods of the source image must be unfolded and transformed at once. Rather, as shown below, a portion of the image can be processed with each pass. Thus, in the example that follows, only the first eight neighborhoods of the image are unfolded and, subsequently, transformed.

The effect of unfolding a portion of the source image into the intermediate image is shown below. Those skilled in the art will appreciate that such unfolding can be accomplished in any manner known in the art.

| a0 | b0 | c0 | d0 | e0 | f0 | g0 | h0 | |
|----|----|----|----|----|----|----|----|---|
| a1 | b1 | c1 | d1 | e1 | f1 | g1 | h1 | |
| a2 | b2 | c2 | d2 | e2 | f2 | g2 | h2 | |
| a3 | b3 | c3 | d3 | e3 | f3 | g3 | h3 | |
| a4 | b4 | c4 | d4 | e4 | f4 | g4 | h4 | Intermediate Image |
| a5 | b3 | c5 | d5 | e3 | f5 | g5 | h5 | |
| a6 | b6 | c6 | d6 | e6 | f6 | g6 | h6 | |
| a7 | b7 | c7 | d7 | e7 | f7 | g7 | h7 | |
| a8 | b6 | c8 | d8 | e6 | f8 | g8 | h8 | |

A preferred technique for unfolding is shown in the following sections. This technique, which requires only seven eight-element registers, designated R0–R7, can be effected using the registers of any modern microprocessor and, preferably, a superscalar processor, such as the Pentium processor of Intel Corporation.

At the outset, the first two neighborhoods of the image are loaded into registers R0–R2 and into R4, as shown below. A mask is set in R3, identifying the first column as being of interest.

| R0 | a0 | a1 | a2 | b0 | b1 | b2 | c0 | c1 |
|----|----|----|----|----|----|----|----|----|
| R1 | a0 | a1 | a2 | b0 | b1 | b2 | c0 | c1 |
| R2 | a0 | a1 | a2 | b0 | b1 | b2 | c0 | c1 |
| R3 | 1  | 0  | 0  | 0  | 0  | 0  | 0  | 0  |
| R4 | a0 | a1 | a2 | b0 | b1 | b2 | c0 | c1 |
| R5 | 0  | 0  | 0  | 0  | 0  | 0  | 0  | 0  |
| R6 | 0  | 0  | 0  | 0  | 0  | 0  | 0  | 0  |

Registers R1 and R2 are then left-shifted by one and two columns, respectively, to place pixels a1 and a2 into position, as shown below:

| R0 | a0 | a1 | a2 | b0 | b1 | b2 | c0 | c1 |
|----|----|----|----|----|----|----|----|----|
| R1 | a1 | a2 | b0 | b1 | b2 | c0 | c1 | 0  |
| R2 | a2 | b0 | b1 | b2 | c0 | c1 | 0  | 0  |
| R3 | 1  | 0  | 0  | 0  | 0  | 0  | 0  | 0  |
| R4 | a0 | a1 | a2 | b0 | b1 | b2 | c0 | c1 |
| R5 | 0  | 0  | 0  | 0  | 0  | 0  | 0  | 0  |
| R6 | 0  | 0  | 0  | 0  | 0  | 0  | 0  | 0  |

The mask in R3 is applied to extract values the values of pixels a0–a2.

| R0 | a0 | 0  | 0  | 0  | 0  | 0  | 0  | 0  |
|----|----|----|----|----|----|----|----|----|
| R1 | a1 | 0  | 0  | 0  | 0  | 0  | 0  | 0  |
| R2 | a2 | 0  | 0  | 0  | 0  | 0  | 0  | 0  |
| R3 | 1  | 0  | 0  | 0  | 0  | 0  | 0  | 0  |
| R4 | a0 | a1 | a2 | b0 | b1 | b2 | c0 | c1 |
| R5 | 0  | 0  | 0  | 0  | 0  | 0  | 0  | 0  |
| R6 | 0  | 0  | 0  | 0  | 0  | 0  | 0  | 0  |

The contents of R0 and R1 are save to R5 and R6, respectively. The mask in R3 is shifted one column to the right, as shown below:

```
R0  a0  0   0   0   0   0   0   0
R1  a1  0   0   0   0   0   0   0
R2  a2  0   0   0   0   0   0   0
R3  0   1   0   0   0   0   0   0
R4  a0  a1  a2  b0  b1  b2  c0  c1
R5  a0  0   0   0   0   0   0   0
R6  a1  0   0   0   0   0   0   0
```

R4, which still retains pristine versions of the first two neighborhoods (along with a portion of a third neighborhood), is used to reload R0 and R1. R0 and R1 are right-shifted two and three columns, respectively, to place the values of pixels b0 and b1 in position, as shown below:

```
R0  a2  b0  b1  b2  c0  c1  0   0
R1  b0  b1  b2  c0  c1  0   0   0
R2  a2  0   0   0   0   0   0   0
R3  0   1   0   0   0   0   0   0
R4  a0  a1  a2  b0  b1  b2  c0  c1
R5  a0  0   0   0   0   0   0   0
R6  a1  0   0   0   0   0   0   0
```

The mask in R3 is applied to extract values the values of pixels b0 and b1, as shown below:

```
R0  0   b0  0   0   0   0   0   0
R1  0   b1  0   0   0   0   0   0
R2  a2  0   0   0   0   0   0   0
R3  0   1   0   0   0   0   0   0
R4  a0  a1  a2  b0  b1  b2  c0  c1
R5  a0  0   0   0   0   0   0   0
R6  a1  0   0   0   0   0   0   0
```

R0 and R1 are updated to restore the prior values (from R5 and R6), along with the newly extracted values, as shown below:

```
R0  a0  b0  0   0   0   0   0   0
R1  a1  b1  0   0   0   0   0   0
R2  a2  0   0   0   0   0   0   0
R3  0   1   0   0   0   0   0   0
R4  a0  a1  a2  b0  b1  b2  c0  c1
R5  a0  0   0   0   0   0   0   0
R6  a1  0   0   0   0   0   0   0
```

The contents of R2 are saved to R5. Pristine register R4 is then copied to R2, which is left shifted to place the value of pixel b2 in position, as shown below:

```
R0  a0  b0  0   0   0   0   0   0
R1  a1  b1  0   0   0   0   0   0
R2  b1  b2  c0  c1  0   0   0   0
R3  0   1   0   0   0   0   0   0
R4  a0  a1  a2  b0  b1  b2  c0  c1
R5  a2  0   0   0   0   0   0   0
R6  a1  0   0   0   0   0   0   0
```

The mask contained in R3 is applied to R2 to extract the value of pixel b2, as shown below:

```
R0  a0  b0  0   0   0   0   0   0
R1  a1  b1  0   0   0   0   0   0
R2  0   b2  0   0   0   0   0   0
R3  0   1   0   0   0   0   0   0
R4  a0  a1  a2  b0  b1  b2  c0  c1
R5  a2  0   0   0   0   0   0   0
R6  a1  0   0   0   0   0   0   0
```

Register R2 is then updated from R5 to combine the extracted pixel values, as shown below:

```
R0  a0  b0  0   0   0   0   0   0
R1  a1  b1  0   0   0   0   0   0
R2  a2  b2  0   0   0   0   0   0
R3  0   1   0   0   0   0   0   0
R4  a0  a1  a2  b0  b1  b2  c0  c1
R5  a2  0   0   0   0   0   0   0
R6  a1  0   0   0   0   0   0   0
```

The contents of R0 and R1 are again saved to R5 and R6. The mask in R3 is shifted one column to the right, as shown below:

```
R0  a0  b0  0   0   0   0   0   0
R1  a1  b1  0   0   0   0   0   0
R2  a2  b2  0   0   0   0   0   0
R3  0   0   1   0   0   0   0   0
R4  a0  a1  a2  b0  b1  b2  c0  c1
R5  a0  b0  0   0   0   0   0   0
R6  a1  b1  0   0   0   0   0   0
```

Pristine register R4 is copied to R0 and R1, the contents of which are shifted to place the values of pixels c0 and c1 in position, as shown below:

```
R0  b1  b2  c0  c1  0   0   0   0
R1  b2  c0  c1  0   0   0   0   0
R2  a2  b2  0   0   0   0   0   0
R3  0   0   1   0   0   0   0   0
R4  a0  a1  a2  b0  b1  b2  c0  c1
R5  a0  b0  0   0   0   0   0   0
R6  a1  b1  0   0   0   0   0   0
```

The mask in R3 is applied to R0 and R1 to extract the values of c0 and c1, respectively, as shown below:

```
R0  0   0   c0  0   0   0   0   0
R1  0   0   c1  0   0   0   0   0
R2  a2  b2  0   0   0   0   0   0
R3  0   0   1   0   0   0   0   0
R4  a0  a1  a2  b0  b1  b2  c0  c1
R5  a0  b0  0   0   0   0   0   0
R6  a1  b1  0   0   0   0   0   0
```

Once again, R0 and R1 are updated with the contents of R5 and R6 to combine the extracted values, as shown below:

```
R0  a0  b0  c0  0   0   0   0   0
R1  a1  b1  c1  0   0   0   0   0
R2  a2  b2  0   0   0   0   0   0
R3  0   0   1   0   0   0   0   0
R4  a0  a1  a2  b0  b1  b2  c0  c1
R5  a0  b0  0   0   0   0   0   0
R6  a1  b1  0   0   0   0   0   0
```

The contents of R2 are saved to R5.

```
R0  a0  b0  c0  0   0   0   0   0
R1  a1  b1  c1  0   0   0   0   0
R2  a2  b2  0   0   0   0   0   0
R3  0   0   1   0   0   0   0   0
R4  a0  a1  a2  b0  b1  b2  c0  c1
R5  a2  b2  0   0   0   0   0   0
R6  a1  b1  0   0   0   0   0   0
```

R2 is, then, loaded from pristine register R4 and the contents left-shifted to place the value of pixel c2 in position, as shown below:

```
R0  a0  b0  c0  0   0   0   0   0
R1  a1  b1  c1  0   0   0   0   0
R2  0   0   c2  d0  d1  d2  e0  e1
R3  0   0   1   0   0   0   0   0
R4  c2  d0  d1  d2  e0  e1  e2  f0
R5  a2  b0  0   0   0   0   0   0
R6  a1  b1  0   0   0   0   0   0
```

The mask in R3 is applied to extract c2 from R2:

```
R0  a0  b0  c0  0   0   0   0   0
R1  a1  b1  c1  0   0   0   0   0
R2  0   0   c2  0   0   0   0   0
R3  0   0   1   0   0   0   0   0
R4  c2  d0  d1  d2  e0  e1  e2  f0
R5  a2  b0  0   0   0   0   0   0
R6  a1  b1  0   0   0   0   0   0
```

R2 is then updated from R5 to combine the extracted values:

```
R0  a0  b0  c0  0   0   0   0   0
R1  a1  b1  c1  0   0   0   0   0
R2  a2  b0  c2  0   0   0   0   0
R3  0   0   1   0   0   0   0   0
R4  c2  d0  d1  d2  e0  e1  e2  f0
R5  a2  b0  0   0   0   0   0   0
R6  a1  b1  0   0   0   0   0   0
```

The foregoing process is repeated until the first three pixels in each of the first eight neighborhoods reside in R0–R2, as shown below:

```
R0  a0  b0  c0  d0  e0  f0  g0  h0
R1  a1  b1  c1  d1  e1  f1  g1  h1
R2  a2  b0  c2  d2  e0  f2  g2  h2
R3
R4
R5
R6
```

At this stage, the values in R0–R2 are loaded into the intermediate array. The above-described process is then repeated to "unfold" pixels a3–h5:

```
R0  a3  b3  c3  d3  e3  f3  g3  h3
R1  a4  b4  c4  d4  e4  f4  g4  h4
R2  a5  b3  c5  d5  e3  f5  g5  h5
R3
R4
R5
R6
```

Those values are, in turn, loaded into the intermediate array. The above-described process is then repeated, again, "unfold" pixels a6—h8:

```
R0  a6  b6  c6  d6  e6  f6  g6  h6
R1  a7  b7  c7  d7  e7  f7  g7  h7
R2  a8  b6  c8  d8  e8  f8  g8  h8
R3
R4
R5
R6
```

These final values are loaded into the intermediate array, which holds the unfolded neighborhoods in the manner shown above and reprinted below.

```
a0  b0  c0  d0  e0  f0  g0  h0
a1  b1  c1  d1  e1  f1  g1  h1
a2  b2  c2  d2  e2  f2  g2  h2
a3  b3  c3  d3  e3  f3  g3  h3
a4  b4  c4  d4  e4  f4  g4  h4  Intermediate Array
a5  b3  c5  d5  e3  f5  g5  h5
a6  b6  c6  d6  e6  f6  g6  h6
a7  b7  c7  d7  e7  f7  g7  h7
a8  b6  c8  d8  e6  f8  g8  h8
```

In step 23, the offset matrix is unfolded, e.g., in the manner discussed above, and duplicated to provide a multi-neighborhood array having one column corresponding to each neighborhood in the intermediate array, as illustrated below:

| | | | | | | | |
|---|---|---|---|---|---|---|---|
| s0 | s0 | s0 | s0 | s0 | s0 | s0 | s0 |
| s1 | s1 | s1 | s1 | s1 | s1 | s1 | s1 |
| s2 | s2 | s2 | s2 | s2 | s2 | s2 | s2 |
| s3 | s3 | s3 | s3 | s3 | s3 | s3 | s3 |
| s4 | s4 | s4 | s4 | s4 | s4 | s4 | s4 |
| s5 | s5 | s5 | s5 | s5 | s5 | s5 | s5 |
| s6 | s6 | s6 | s6 | s6 | s6 | s6 | s6 |
| s7 | s7 | s7 | s7 | s7 | s7 | s7 | s7 |
| s8 | s8 | s8 | s8 | s8 | s8 | s8 | s8 |

Transformation of the unfolded neighborhoods proceeds with step 25, in which the first two rows intermediate image and of the unfolded offset array are loaded into registers R0–R3, as shown below:

| | | | | | | | | |
|---|---|---|---|---|---|---|---|---|
| R0 | a0 | b0 | c0 | d0 | e0 | f0 | g0 | h0 |
| R1 | a1 | b1 | c1 | d1 | e1 | f1 | g1 | h1 |
| R2 | s0 | s0 | s0 | s0 | s0 | s0 | s0 | s0 |
| R3 | s1 | s1 | s1 | s1 | s1 | s1 | s1 | s1 |
| R4 | 0 | 0 | 0 | 0 | 0 | 0 | 0 | 0 |
| R5 | 0 | 0 | 0 | 0 | 0 | 0 | 0 | 0 |
| R6 | 0 | 0 | 0 | 0 | 0 | 0 | 0 | 0 |

In step 27, the columns of R0 are added to R2, while those of R1 are added to R3, the results are placed in the columns of R4 and R5, respectively. Primes are used to identify the results of such additions. Thus, for example, a0' represents the sum of a0 and s0, a1' represents the sum of a1 and s1, and so forth

| | | | | | | | | |
|---|---|---|---|---|---|---|---|---|
| R0 | a0 | b0 | c0 | d0 | e0 | f0 | g0 | h0 |
| R1 | a1 | b1 | c1 | d1 | e1 | f1 | g1 | h1 |
| R2 | s0 | s0 | s0 | s0 | s0 | s0 | s0 | s0 |
| R3 | s1 | s1 | s1 | s1 | s1 | s1 | s1 | s1 |
| R4 | a0' | b0' | c0' | d0' | e0' | f0' | g0' | h0' |
| R5 | a1' | b1' | c1' | d1' | e1' | f1' | g1' | h1' |
| R6 | 0 | 0 | 0 | 0 | 0 | 0 | 0 | 0 |

In step 29, the illustrated method identifies the pixel intensity value of selected rank, e.g., the maximum value for dilation operations and the minimum value for erosion operations, for each column in registers R4 and R5. The results are stored to register R6. Insofar as the illustrated method carries out a dilation operation, the pixel intensity values is depicted as a MAX function of each of the compared values, e.g., max(a0',a1') for the comparison of the first column, max(b0',b1') for the comparison of the second column, and so forth, as shown below:

| | | | | | | | | |
|---|---|---|---|---|---|---|---|---|
| R0 | a0 | b0 | c0 | d0 | e0 | f0 | g0 | h0 |
| R1 | a1 | b1 | c1 | d1 | e1 | f1 | g1 | h1 |
| R2 | s0 | s0 | s0 | s0 | s0 | s0 | s0 | s0 |
| R3 | s1 | s1 | s1 | s1 | s1 | s1 | s1 | s1 |
| R4 | a0' | b0' | c0' | d0' | e0' | f0' | g0' | h0' |
| R5 | a1' | b1' | c1' | d1' | e1' | f1' | g1' | h1' |
| R6 | Max(a0', a1') | max(b0', b1') | max(c0', c1') | max(d0', d1') | max(e0', e1') | max(f0', f1') | max(g0', g1') | max(h0', h1') |

In step 31, the maximums in R6 are save to R4. The next row of the intermediate image is then stored to R2 as shown below:

| | | | | | | | | |
|---|---|---|---|---|---|---|---|---|
| R0 | a0 | b0 | c0 | d0 | e0 | f0 | g0 | h0 |
| R1 | a2 | b2 | c2 | d2 | e2 | f2 | g2 | h2 |
| R2 | s0 | s0 | s0 | s0 | s0 | s0 | s0 | s0 |
| R3 | s2 | s2 | s2 | s2 | s2 | s2 | s2 | s2 |
| R4 | Max(a0', a1') | max(b0', b1') | max(c0', c1') | max(d0', d1') | max(e0', e1') | max(f0', f1') | max(g0', g1') | max(h0', h1') |
| R5 | a1' | b1' | c1' | d1' | e1' | f1' | g1' | h1' |
| R6 | Max(a0', a1') | max(b0', b1') | max(c0', c1') | max(d0', d1') | max(e0', e1') | max(f0', f1') | max(g0', g1') | max(h0', h1') |

In step 33, the columns of the newly loaded row of the intermediate image are added to the columns of the unfolded offset array. The results are loaded into R5, as designated in the drawings by primes.

| | | | | | | | | |
|---|---|---|---|---|---|---|---|---|
| R0 | a0 | b0 | c0 | d0 | e0 | f0 | g0 | h0 |
| R1 | a2 | b2 | c2 | d2 | e2 | f2 | g2 | h2 |
| R2 | s0 | s0 | s0 | s0 | s0 | s0 | s0 | s0 |
| R3 | s2 | s2 | s2 | s2 | s2 | s2 | s2 | s2 |
| R4 | Max($a0'$, $a1'$) | max($b0'$, $b1'$) | max($c0'$, $c1'$) | max($d0'$, $d1'$) | max($e0'$, $e1'$) | max($f0'$, $f1'$) | max($g0'$, $g1'$) | max($h0'$, $h1'$) |
| R5 | $a2'$ | $b2'$ | $c2'$ | $d2'$ | $e2'$ | $f2'$ | $g2'$ | $h2'$ |
| R6 | 0 | 0 | 0 | 0 | 0 | 0 | 0 | 0 |

The method then returns to step 29 in order to compare the new sums in R5 with the values of selected rank.

| | | | | | | | | |
|---|---|---|---|---|---|---|---|---|
| R0 | a0 | b0 | c0 | d0 | e0 | f0 | g0 | h0 |
| R1 | a2 | b2 | c2 | d2 | e2 | f2 | g2 | h2 |
| R2 | s0 | s0 | s0 | s0 | s0 | s0 | s0 | s0 |
| R3 | s2 | s2 | s2 | s2 | s2 | s2 | s2 | s2 |
| R4 | Max($a0'$, $a1'$) | max($b0'$, $b1'$) | max($c0'$, $c1'$) | max($d0'$, $d1'$) | max($e0'$, $e1'$) | max($f0'$, $f1'$) | max($g0'$, $g1'$) | max($h0'$, $h1'$) |
| R5 | $a2'$ | $b2'$ | $c2'$ | $d2'$ | $e2'$ | $f2'$ | $g2'$ | $h2'$ |
| R6 | max($a0'$, $a1'$, $a2'$) | max($b0'$, $b1'$, $b2'$) | max($c0'$, $c1'$, $c2'$) | max($d0'$, $d1'$, $d2'$) | max($e0'$, $e1'$, $e2'$) | max($f0'$, $f1'$, $f2'$) | max($g0'$, $g1'$, $g2'$) | max($h0'$, $h1'$, $h2'$) |

The foregoing steps are repeated until all rows of the intermediate image are processed, i.e., until the pixel values of selected rank have been identified for all columns in that image and, thereby, for all of the selected neighborhoods originally unfolded into the intermediate

| | | | | | | | |
|---|---|---|---|---|---|---|---|
| R0 | a0 | b0 | c0 | d0 | e0 | f0 | g0 | h0 |
| R1 | a8 | b8 | c8 | d8 | e8 | f8 | g8 | h8 |
| R2 | s0 | s0 | s0 | s0 | s0 | s0 | s0 | s0 |
| R3 | s8 | s8 | s8 | s8 | s8 | s8 | s8 | s8 |
| R4 | max($a0'$, $a1'$, $a2'$, $a3'$, $a4'$, $a5'$, $a6'$, $a7'$) | max($b0'$, $b1'$, $b2'$, $b3'$, $b4'$, $b5'$, $b6'$, $b7'$) | max($c0'$, $c1'$, $c2'$, $c3'$, $c4'$, $c5'$, $c6'$, $c7'$) | max($d0'$, $d1'$, $d2'$, $d3'$, $d4'$, $d5'$, $d6'$, $d7'$) | max($e0'$, $e1'$, $e2'$, $e3'$, $e4'$, $e5'$, $e6'$, $e7'$) | max($f0'$, $f1'$, $f2'$, $f3'$, $f4'$, $f5'$, $f6'$, $f7'$) | max($g0'$, $g1'$, $g2'$, $g3'$, $g4'$, $g5'$, $g6'$, $g7'$) | max($h0'$, $h1'$, $h2'$, $h3'$, $h4'$, $h5'$, $h6'$, $h7'$) |
| R5 | $a8'$ | $b8'$ | $c8'$ | $d8'$ | $e8'$ | $f8'$ | $g8'$ | $h8'$ |
| R6 | max($a0'$, $a1'$, $a2'$, $a3'$, $a4'$, $a5'$, $a6'$, $a7'$, $a8'$) | max($b0'$, $b1'$, $b2'$, $b3'$, $b4'$, $b5'$, $b6'$, $b7'$, $b8'$) | max($c0'$, $c1'$, $c2'$, $c3'$, $c4'$, $c5'$, $c6'$, $c7'$, $c8'$) | max($d0'$, $d1'$, $d2'$, $d3'$, $d4'$, $d5'$, $d6'$, $d7'$, $d8'$) | max($e0'$, $e1'$, $e2'$, $e3'$, $e4'$, $e5'$, $e6'$, $e7'$, $e8'$) | max($f0'$, $f1'$, $f2'$, $f3'$, $f4'$, $f5'$, $f6'$, $f7'$, $f8'$) | max($g0'$, $g1'$, $g2'$, $g3'$, $g4'$, $g5'$, $g6'$, $g7'$, $g8'$) | max($h0'$, $h1'$, $h2'$, $h3'$, $h4'$, $h5'$, $h6'$, $h7'$, $h8'$) |

These column/neighborhood winners can then be loaded into the transformation image, i.e., at locations corresponding to the centers of the respective underlying neighborhoods. Alternatively, in the illustrated embodice, they are loaded into an intermediate destination image, as shown below:

```
    0           0           0           0           0           0           0           0
 max(a0'    max(b0'     max(c0'    max(d0'     max(e0'     max(f0'    max(g0'     max(h0'
  a1', a2',   b1', b2',   c1', c2',   d1', d2',   e1', e2',   f1', f2',   g1', g2',   h1', h2',
  a3', a4',   b3', b4',   c3', c4',   d3', d4',   e3', e4',   f3', f4',   g3', g4',   h3', h4',
  a5', a6',   b5', b6',   c5', c6',   d5', d6',   e5', e6',   f5', f6',   g5', g6',   h6', h6',
  a7', a8')   b7', b8')   c7', c8')   d7', d8')   e7', e8')   f7', f8')   g7', g8')   h7', h8')
    0           0           0           0           0           0           0           0
```

The illustrated process then returns to step 21, where a successive set of selected neighborhoods of the original source image are unfolded into the intermediate image, as shown below:

```
 a1  b1  c1  d1  e1  f1  g1  h1
 a2  b2  c2  d2  e2  f2  g2  h2
 b0  c0  d0  e0  f0  g0  h0   0
 a4  b4  c4  d4  e4  f4  g4  h4
 a5  b5  c5  d5  e5  f5  g5  h5
 b3  c4  d4  e4  f4  g4  h4   0
 a7  b7  c7  d7  e7  f7  g7  h7
 a8  b8  c8  d8  e8  f8  g8  h8
 b6  c6  d6  e6  f6  g6  h6   0
```

Steps 23–35 are then repeated for those newly loaded neighborhoods, and the result is stored in the transformation image or the intermediate destination image, as shown below:

```
 a2  b2  c2  d2  e2  f2  g2  h2
 b0  c0  d0  e0  f0  g0  h0   0
 b1  c1  d1  e1  f1  g1  h1   0
 a5  b5  c5  d5  e5  f5  g5  h5
 b3  c3  d3  e3  f3  g3  h3   0
 b4  c4  d4  e4  f4  g4  h4   0
 a8  b8  c8  d8  e8  f8  g8  h8
 b6  c6  d6  e6  f6  g6  h6   0
 b7  c7  d7  e7  f7  g7  h7   0
```

Steps 23–35 are then repeated for those newly loaded neighborhoods, and the result is stored in the transformation image or the intermediate destination image, as shown below:

```
    0           0           0           0           0           0           0           0
 max(a0'    max(b0'     max(c0'    max(d0'     max(e0'     max(f0'    max(g0'     max(h0'
  a1', a2',   b1', b2',   c1', c2',   d1', d2',   e1', e2',   f1', f2',   g1', g2',   h1', h2',
  a3', a4',   b3', b4',   c3', c4',   d3', d4',   e3', e4',   f3', f4',   g3', g4',   h3', h4',
  a5', a6',   b5', b6',   c5', c6',   d5', d6',   e5', e6',   f5', f6',   g5', g6',   h5', h6',
  a7', a8')   b7', b8')   c7', c8')   d7', d8')   e7', e8')   f7', f8')   g7', g8')   h7', h8')
 max(a1',   max(b1',    max(c1',   max(d1',    max(e1',    max(f1',   max(g1',    max(h1',
  a2', b0',   b2', c0',   c2', d0',   d2', e0',   e2', f0',   f2', g0',   g2', h0',   h2', 0,
  a4', a5',   b4', b5',   c4', c5',   d4', d5',   e4', e5',   f4', f5',   g4', g5',   h4', h5',
  b3', a7',   c3', b7',   d3', c7',   e3', d7',   f3', e7',   g3', f7',   h3', g7',   0, h7',
  a8', b6')   b8', c6')   c8', d6')   d8', e6')   e8', f6')   f8', g6')   g8', h6')   h8', 0)
```

The illustrated process then returns to step 21, where a successive set of selected neighborhoods of the original source image are unfolded into the intermediate image, as shown below

| max($a2'$ | max($b2'$ | max($c2'$ | max($d2'$ | max($e2'$ | max($f2'$ | max($g2'$ | max($h2'$ | |
|---|---|---|---|---|---|---|---|---|
| $b0', b1'$, | $c0', c1'$, | $d0', d1'$, | $e0', e1'$, | $f0', f1'$, | $g0', g1'$, | $h0', h1'$, | 0, 0 | |
| $a5', b3'$, | $b5', c3'$, | $c5', d3'$, | $d5', e3'$, | $e5', f3'$, | $f5', g3'$, | $g5', h3'$, | $h5', 0$, | |
| $b4', a8'$, | $c4', b8'$, | $d4', c8'$, | $e4', d8'$, | $f4', e8'$, | $g4', f8'$, | $h4', g8'$, | $0, h8'$, | |
| $b6', b7'$) | $c6', c7'$) | $d6', d7'$) | $e6', e7'$) | $f6', f7'$) | $g6', g7'$) | $h6', h7'$) | 0, 0) | |
| max($a0'$ | max($b0'$ | max($c0'$ | max($d0'$ | max($e0'$ | max($f0'$ | max($g0'$ | max($h0'$ | |
| $a1', a2'$, | $b1', b2'$, | $c1', c2'$, | $d1', d2'$, | $e1', e2'$, | $f1', f2'$, | $g1', g2'$, | $h1', h2'$, | |
| $a3', a4'$, | $b3', b4'$, | $c3', c4'$, | $d3', d4'$, | $e3', e4'$, | $f3', f4'$, | $g3', g4'$, | $h3', h4'$, | |
| $a5', a6'$, | $b5', b6'$, | $c5', c6'$, | $d5', d6'$, | $e5', e6'$, | $f5', f6'$, | $g5', g6'$, | $h5', h6'$, | |
| $a7', a8'$) | $b7', b8'$) | $c7', c8'$) | $d7', d8'$) | $e7', e8'$) | $f7', f8'$) | $g7', g8'$) | $h7', h8'$) | |
| max($a1'$ | max($b1'$ | max($c1'$ | max($d1'$ | max($e1'$ | max($f1'$ | max($g1'$ | max($h1'$ | |
| $a2', b0'$, | $b2', c0'$, | $c2', d0'$, | $d2', e0'$, | $e2', f0'$, | $f2', g0'$, | $g2', h0'$, | $h2', 0$, | |
| $a4', a5'$, | $b4', b5'$, | $c4', c5'$, | $d4', d5'$, | $e4', e5'$, | $f4', f5'$, | $g4', g5'$, | $h4', h5'$, | |
| $b3', a7'$, | $c3', b7'$, | $d3', c7'$, | $e3', d7'$, | $f3', e7'$, | $g3', f7'$, | $h3', g7'$, | $0, h7'$, | |
| $a8', b6'$) | $b8', c6'$) | $c8', d6'$) | $d8', e6'$) | $e8', f6'$) | $f8', g6'$) | $g8', h6'$) | $h8', 0$) | |

In the illustrated embodiment, the values in the upper left and lower right corners of the intermediate destination image are zeroed to prevent reporting of winners of incomplete neighborhoods (or, put another way, to prevent reporting of incompletely transformed portions of the source image):

| 0 | max($a2'$ | max($b2'$ | max($c2'$ | max($d2'$ | max($e2'$ | max($f2'$ | max($g2'$ |
|---|---|---|---|---|---|---|---|
|  | $b0', b1'$, | $c0', c1'$, | $d0', d1'$, | $e0', e1'$, | $f0', f1'$, | $g0', g1'$, | $h0', h1'$, |
|  | $a5', b3'$, | $b5', c3'$, | $c5', d3'$, | $d5', e3'$, | $e5', f3'$, | $f5', g3'$, | $g5', h3'$, |
|  | $b4', a8'$, | $c4', b8'$, | $d4', c8'$, | $e4', d8'$, | $f4', e8'$, | $g4', f8'$, | $h4', g8'$, |
|  | $b6', b7'$) | $c6', c7'$) | $d6', d7'$) | $e6', e7'$) | $f6', f7'$) | $g6', g7'$) | $h6', h7'$) |
| max($a0'$ | max($b0'$ | max($c0'$ | max($d0'$ | max($e0'$ | max($f0'$ | max($g0'$ | max($h0'$ |
| $a1', a2'$, | $b1', b2'$, | $c1', c2'$, | $d1', d2'$, | $e1', e2'$, | $f1', f2'$, | $g1', g2'$, | $h1', h2'$, |
| $a3', a4'$, | $b3', b4'$, | $c3', c4'$, | $d3', d4'$, | $e3', e4'$, | $f3', f4'$, | $g3', g4'$, | $h3', h4'$, |
| $a5', a6'$, | $b5', b6'$, | $c5', c6'$, | $d5', d6'$, | $e5', e6'$, | $f5', f6'$, | $g5', g6'$, | $h5', h6'$, |
| $a7', a8'$) | $b7', b8'$) | $c7', c8'$) | $d7', d8'$) | $e7', e8'$) | $f7', f8'$) | $g7', g8'$) | $h7', h8'$) |
| max($a1'$ | max($b1'$ | max($c1'$ | max($d1'$ | max($e1'$ | max($f1'$ | max($g1'$ | 0 |
| $a2', b0'$, | $b2', c0'$, | $c2', d0'$, | $d2', e0'$, | $e2', f0'$, | $f2', g0'$, | $g2', h0'$, |  |
| $a4', a5'$, | $b4', b5'$, | $c4', c5'$, | $d4', d5'$, | $e4', e5'$, | $f4', f5'$, | $g4', g5'$, |  |
| $b3', a7'$, | $c3', b7'$, | $d3', c7'$, | $e3', d7'$, | $f3', e7'$, | $g3', f7'$, | $h3', g7'$, |  |
| $a8', b6'$) | $b8', c6'$) | $c8', d6'$) | $d8', e6'$) | $e8', f6'$) | $f8', g6'$) | $g8', h6'$) |  |

Figure 3:
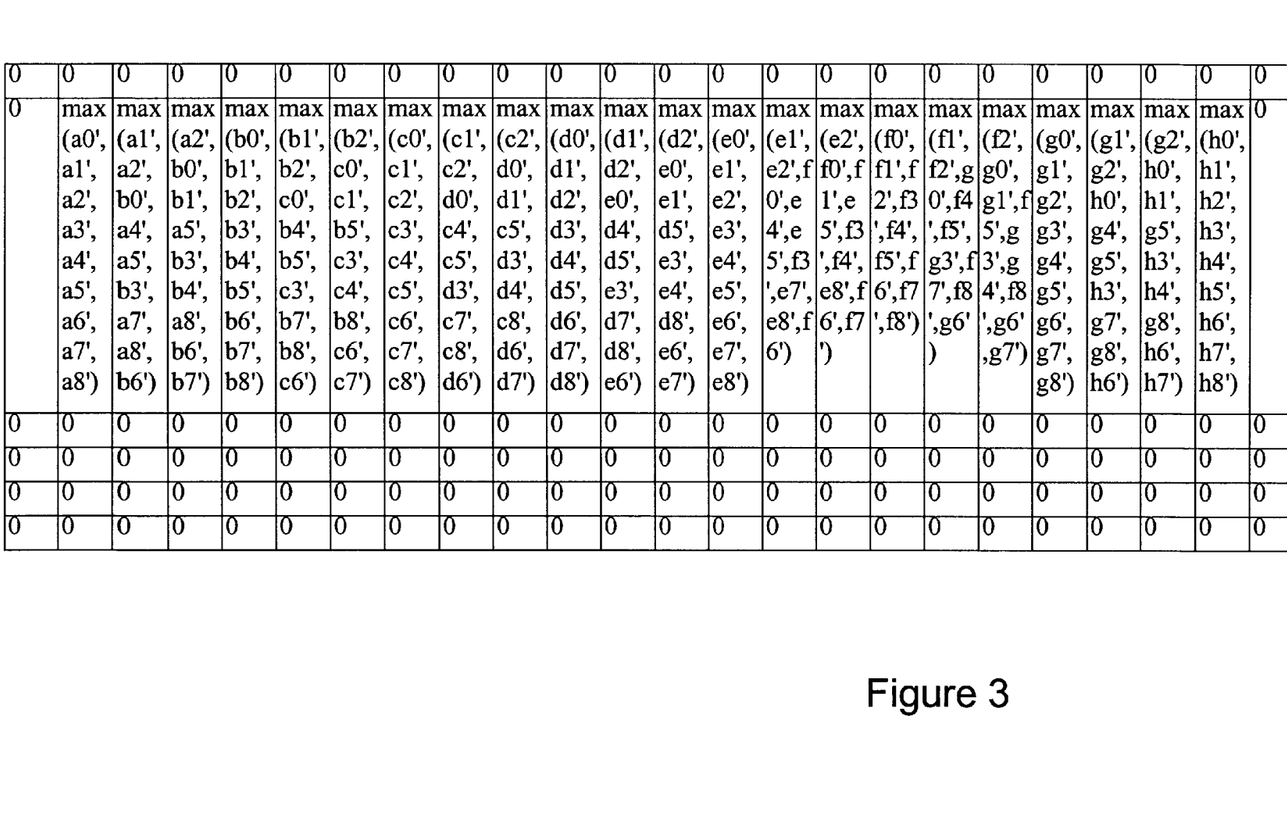
FIG. 3 depicts how pixel intensity values of selected rank for respective column of an intermediate image can be loaded into a transformation image in a system according to the invention.
Figure 4:
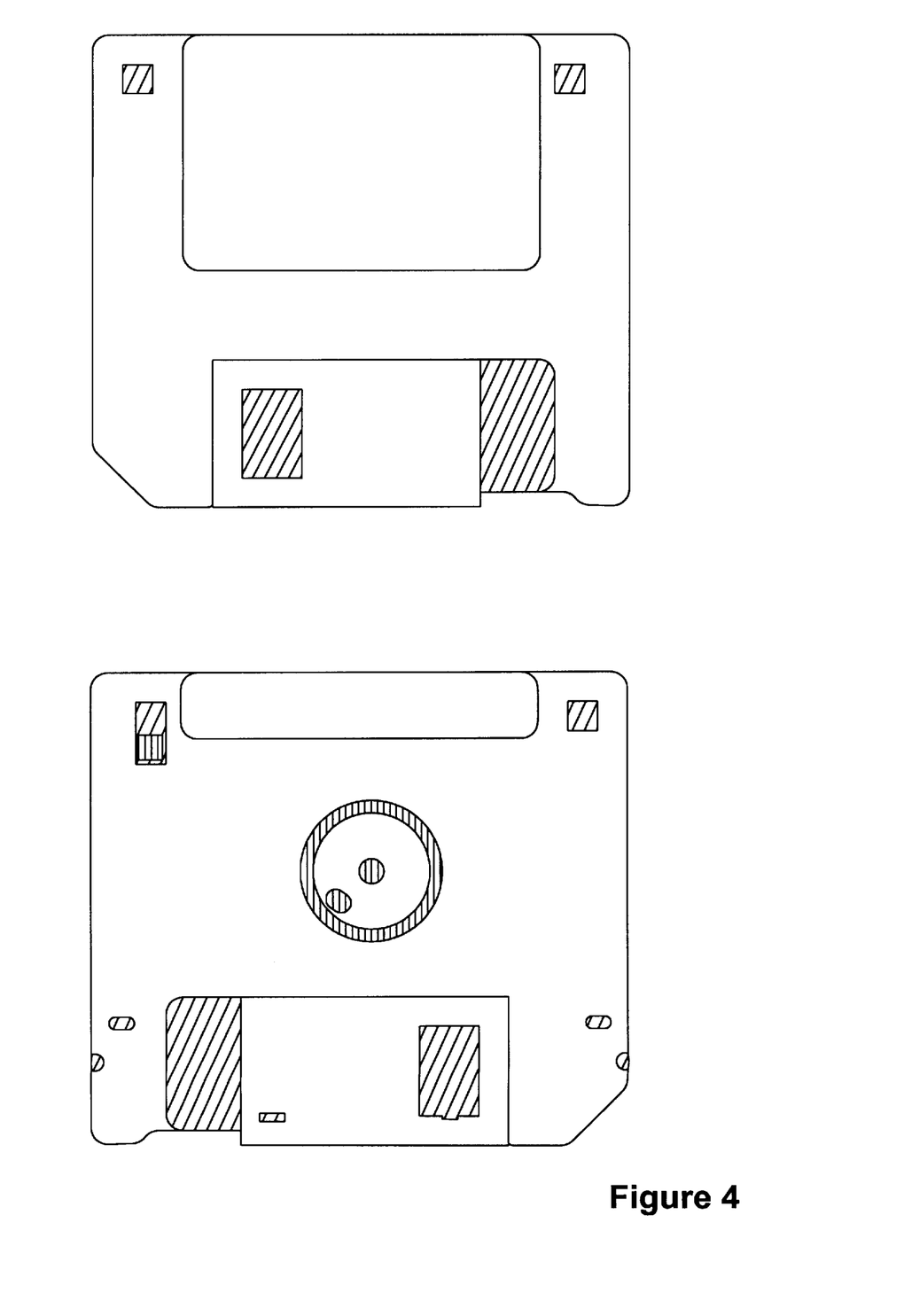
FIG. 4 depicts a computer readable medium containing programming instructions for configuring a digital data processor to practice the invention.

In embodiments where an intermediate destination image of the type shown above is used, the contents of that array can be unfolded into the transformation image in any convention manner. The result of such an operation is shown in FIG. 3. FIG. 3 depicts an article of manufacture, to wit, a magnetic diskette, composed of a computer usable media, to wit, a magnetic disk, embodying a computer program that causes device 20, or other such digital data processing apparatus, to operate in accord with the methods described above in connection with FIGS. 1–5. The diskette is shown in front view and back view. It is of conventional construction and has the computer program stored on the magnetic media therein in a conventional manner readable, e.g., via a read/write head contained in a diskette drive of apparatus 30. It will be appreciated that diskette is shown by way of example only and that other articles of manufacture comprising computer usable media on which programs intended to cause a computer to execute in accord with the teachings hereof are also embraced by the invention.

Described above are systems and methods meeting the objects set forth herein. As noted earlier, these systems and methods require only a limited number of registers in order to generate morphological transformations. As a result, they permit higher pixel throughput and, consequently, speed processing of images. They also allow processing of larger images. Moreover, the systems and methods organize data flow in a manner that minimizes memory access penalties, specifically, through better utilization of data residing in cache. This minimizes memory faults and also, therefore, speeds image processing.

Those skilled in the art will appreciate that the specific embodiments illustrated in the drawings and described above are illustrative only, and that other embodiments incorporating modifications thereto fall within the scope of the invention. Thus, for example, it will be appreciated that the invention is not limited to practice with square neighborhoods, much less 3×3 neighborhoods of the types shown above. Moreover, it will be appreciated that the invention can be applied to use of morphological transformation other than erosion and dilation operations, e.g., via selection of pixels of selected ranks other than minimum and maximum. Still further, for example, it will be appreciated that the methods and apparatus described above need not be implemented in software but, rather, can be implemented in hardware as well. Yet still further, it will be appreciated that the invention can be practiced with zero offsets or other uniform offsets, as well as non-uniform offsets. In view of the foregoing, what I claim is:

What is claimed is:

1. A machine method for morphological transformation of a source image into a transformation image, the method comprising the steps of
   A. generating a first intermediate image by arranging pixels from selected neighborhoods of the source image in respective columns of the intermediate image,
   B. for each of the selected columns of pixels in the intermediate image, determining a value of selected rank as between the pixels in that column by comparing intensities thereof, the value of selected rank being a "column winner" for that column, and retaining the column winner for that column in the transformation image,
   C. generating one or more further intermediate images by arranging pixels from further selected neighborhoods of the source image in respective columns of respective such further intermediate images, and
   D. repeating step (B) for each respective further intermediate image, retaining the column winners determined in step (B) for each respective further intermediate image in the transformation image.

2. A method according to claim 1, wherein step (B) comprises
   (i) loading the selected columns of a first row of the first intermediate image into corresponding columns in a first data store,
   (ii) loading the selected columns of a second row of the first intermediate image into corresponding columns in a second data store,
   (iii) adding a respective offset to each of at least selected columns in the first and second stores,
   (iv) for each of the selected columns in the first data store, determining the column winner for that column by comparing a value in that column with a value in a corresponding column in the second store, and loading the column winner so determined into a corresponding column of the first data store.

3. A method according to claim 2, comprising for each of the selected additional rows of pixels in the first intermediate image, loading the selected columns of that row into corresponding columns in the second store and repeating steps (B)(iii) and B(iv).

4. A method according to any of claims 1–3, wherein step (B) comprises adding an offset to the intensity of each pixel in a column prior to comparing to it with others in that column.

5. A method according to claim 1, adapted for dilation of the source image, where the selected rank in step (B) is a maximum.

6. A method according to claim 1, adapted for erosion of the source image, where the selected rank in step (B) is a minimum.

7. A method according to claim 1, wherein the neighborhoods are rectangular.

8. A method according to claim 7, wherein the neighborhoods are squares.

9. A method according to claim 8, wherein the neighborhoods are 3×3 squares.

10. An article of manufacture comprising a computer usable medium embodying program code for causing a digital data processor to carry out a method for morphological transformation of a source image into a transformation image, the method comprising the steps of
    A. generating a first intermediate image by arranging pixels from selected neighborhoods of the source image in respective columns of the intermediate image,
    B. for each of the selected columns of pixels in the intermediate image, determining a value of selected rank as between the pixels in that column by comparing intensities thereof, the value of selected rank being a "column winner" for that column, and retaining the column winner for that column in the transformation image,
    C. generating one or more further intermediate images by arranging pixels from further selected neighborhoods of the source image in respective columns of respective such further intermediate images, and
    D. repeating step (B) for each respective further intermediate image, retaining the column winners determined in step (B) for each respective further intermediate image in the transformation image.

11. An article according to claim 10, wherein steps (A) and (C) comprise generating respective ones of the first and further intermediate images by arranging pixels from selected neighborhoods of the source image in respective columns of the intermediate image.

12. An article according to claim 10, wherein step (B)(i) comprises adding an offset to the value of each pixel in a column prior to comparing to it with others in that column.

13. An article according to claim 10, wherein step (B) comprises
    (i) loading the selected columns of a first row of the first intermediate image into corresponding columns in a first data store,
    (ii) loading the selected columns of a second row of the first intermediate image into corresponding columns in a second data store,
    (iii) adding a respective offset to each of at least selected columns in the first and second stores,
    (iv) for each of the selected columns in the first data store, determining the column winner for that column by comparing a value in that column with a value in a corresponding column in the second store, and loading the column winner so determined into a corresponding column of the first data.

14. An article according to claim 10, wherein the method is adapted for dilation of the source image, where the selected rank is a maximum.

15. An article according to claim 10, wherein the method is adapted for erosion of the source image, where the selected rank is a minimum.

16. A digital data processing system for morphological transformation of a source image into a transformation image by carrying out a method comprising the steps of
    A. generating a first intermediate image by arranging pixels from selected neighborhoods of the source image in respective columns of the intermediate image,
    B. for each of the selected columns of pixels in the intermediate image, determining a value of selected rank as between the pixels in that column by comparing intensities thereof, the value of selected rank being a "column winner" for that column, and retaining the column winner for that column in the transformation image,
    C. generating one or more further intermediate images by arranging pixels from further selected neighborhoods of the source image in respective columns of respective such further intermediate images, and D. repeating step (B) for each respective further intermediate image, retaining the column winners determined in step (B) for each respective further intermediate image in the transformation image.

17. A digital data processing system according to claim 16, wherein step (B) comprises
   (i) loading the selected columns of a first row of the first intermediate image into corresponding columns in a first data store,
   (ii) loading the selected columns of a second row of the first intermediate image into corresponding columns in a second data store,
   (iii) adding a respective offset to each of at least selected columns in the first and second stores,
   (iv) for each of the selected columns in the first data store, determining the column winner for that column by comparing a value in that column with a value in a corresponding column in the second store, and loading the column winner so determined into a corresponding column of the first data store.

18. A digital data processing system according to claim 17, wherein the method comprises the step of, for each of the selected additional rows of pixels in the first intermediate image, loading the selected columns of that row into corresponding columns in the second store and repeating steps (B)(iii)–B(iv).

19. A digital data processing system according to any of claims 16–18, wherein step (B) comprises adding an offset to the intensity of each pixel in a column prior to comparing to it with others in that column.

20. A digital data processing system according to claim 16, adapted for dilation of the source image, where the selected rank in step (B) is a maximum.

21. A digital data processing system according to claim 16, adapted for erosion of the source image, where the selected rank in step (B) is a minimum.

22. A digital data processing system according to claim 16, wherein the neighborhoods are rectangular.

23. A digital data processing system according to claim 22, wherein the neighborhoods are squares.

24. A digital data processing system according to claim 23, wherein the neighborhoods are 3×3 squares.

* * * * *